(No Model.)
A. R. BOLUSS.
VALVE FOR AIR BRAKES.
No. 436,298. Patented Sept. 9, 1890.
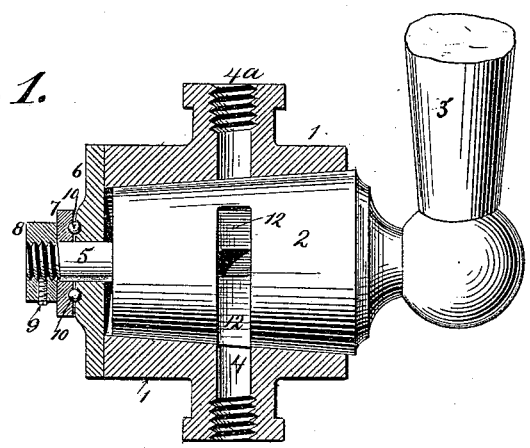
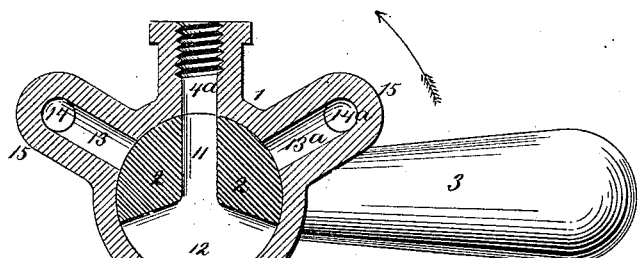
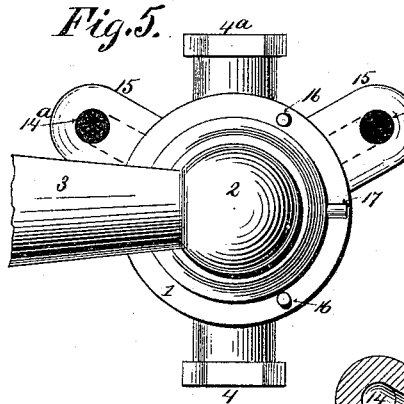
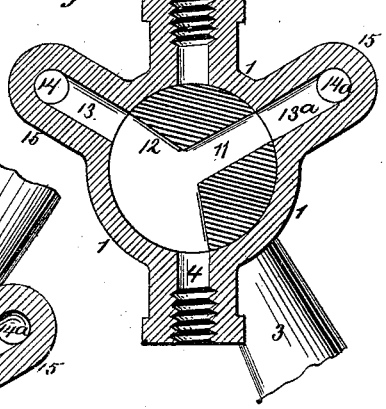
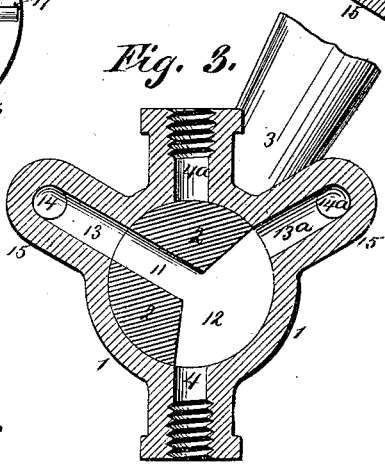
Witnesses:
D. W. Gardner
E. A. Finchel
Inventor:
Alfred R. Boluss
By Ernest C. Webb
Atty

UNITED STATES PATENT OFFICE.

ALFRED R. BOLUSS, OF NORWOOD, OHIO.

VALVE FOR AIR-BRAKES.

SPECIFICATION forming part of Letters Patent No. 436,298, dated September 9, 1890.

Application filed October 29, 1889. Renewed August 21, 1890. Serial No. 362,566. (No model.)

*To all whom it may concern:*

Be it known that I, ALFRED R. BOLUSS, a citizen of the United States, residing at Norwood, in the county of Hamilton, in the State of Ohio, have invented certain new and useful Improvements in Valves for Air-Brakes, of which the following is a description.

My invention relates to an improved form of engineer's valve for use in connection with the air-brake system for a train of cars, the object being to provide a simple, economical, and durable device of such construction that it will be impossible to turn it the wrong way when it becomes necessary to apply the brakes to stop the train. Emergencies frequently arise where it is necessary to operate the brakes with rapidity, and it is then more than ever necessary that no mistake be made in operating the valve controlling the brakes.

In the accompanying drawings, illustrating my invention, in which like parts are designated by similar reference-numerals, Figure 1 is a longitudinal sectional elevation of my improved valve. Fig. 2 is a cross-section of the same, showing the valve in one position; Fig. 3, a cross-section showing it in a second position. Fig. 4 is a cross-section showing it in a third position, and Fig. 5 is a front view showing the stops on the valve to limit the extreme positions of the valve.

In the drawings, 1 is the valve-shell, furnished with ports 4 $4^a$, 13 $13^a$, and 14 $14^a$.

2 is the valve proper, which is recessed, as shown in Figs. 1, 2, 3, and 4, to form ways 11 and 12.

3 is the operating-handle for the valve. The valve is ground to fit the shell 1, so as to make an easy-moving but entirely fluid-tight joint, and it is held in place in its shell by the washers 6 and 7 and a nut 8, which last is screwed upon an extension 5 of the valve 2 and held in place by a set-screw 9.

Between the washers 6 and 7 are interposed small spheres of metal 10 10, which rest in circular grooves cut in the faces of the washers. By this means a tight joint between valve 2 and its shell 1 is obtained, and yet the valve is free to turn in its shell with the least possible amount of friction. The ports or outlets 13 $13^a$ 14 $14^a$ are arranged in projections 15 15 of the shell.

The operation of the valve is as follows: The port $4^a$ is connected to the source of power to be used—such as compressed air in a main reservoir—and the port 4 is connected to the brake system under the cars. In the position shown in Fig. 2 port $4^a$ is connected with port 4 by the ways 11 12, and the source of energy—such as compressed air—thus will be conducted directly to the point of its application. Now if it be desired to set the brakes, the valve, when turned to either the position shown in Fig. 3 or Fig. 4, will shut off the source of power at port $4^a$ from port 4 and connect port 4 directly with the ports $14^a$ and 14, as the valve may be turned, as shown, to exhaust into the atmosphere. By this arrangement it will be seen that it makes no difference which way the valve is turned from the position shown in Fig. 2, as in any case the connection of port 4 with ports $14^a$ and 14 for exhaustion into the atmosphere for setting the brakes is accomplished, so that in case of great emergency, no matter how excited the operator may be, it is impossible to turn the valve in the wrong way, either direction accomplishing the desired result.

It is obvious that a valve of this construction may be provided with packing, if desirable or necessary. It may also be provided on its shell with pins 16, with which a pin 17 on the valve co-operates to limit the movement of the valve.

I claim—

An engineer's valve for air-brake systems, comprising a shell having an inlet and an outlet port and two exhaust-ports, and a rotary plug or valve seated in said shell, and provided with two communicating ways, one of which co-operates with either the inlet or any one of the exhaust-ports in the shell and the other of which is of an area adequate to co-operate with any two of the ports simultaneously to open communication between the inlet and outlet ports or to exhaust the main pipe, whereby the valve will exhaust to set the brakes, whether it be turned to the right or to the left, substantially as described.

In testimony whereof I have hereunto set my hand.

ALFRED R. BOLUSS.

Witnesses:
JAC. C. LOWY,
ERNEST C. WEBB.